Dec. 26, 1922.
C. B. GOLDSMITH.
STUMP PULLER.
FILED JULY 18, 1921.
1,440,008
3 SHEETS-SHEET 2
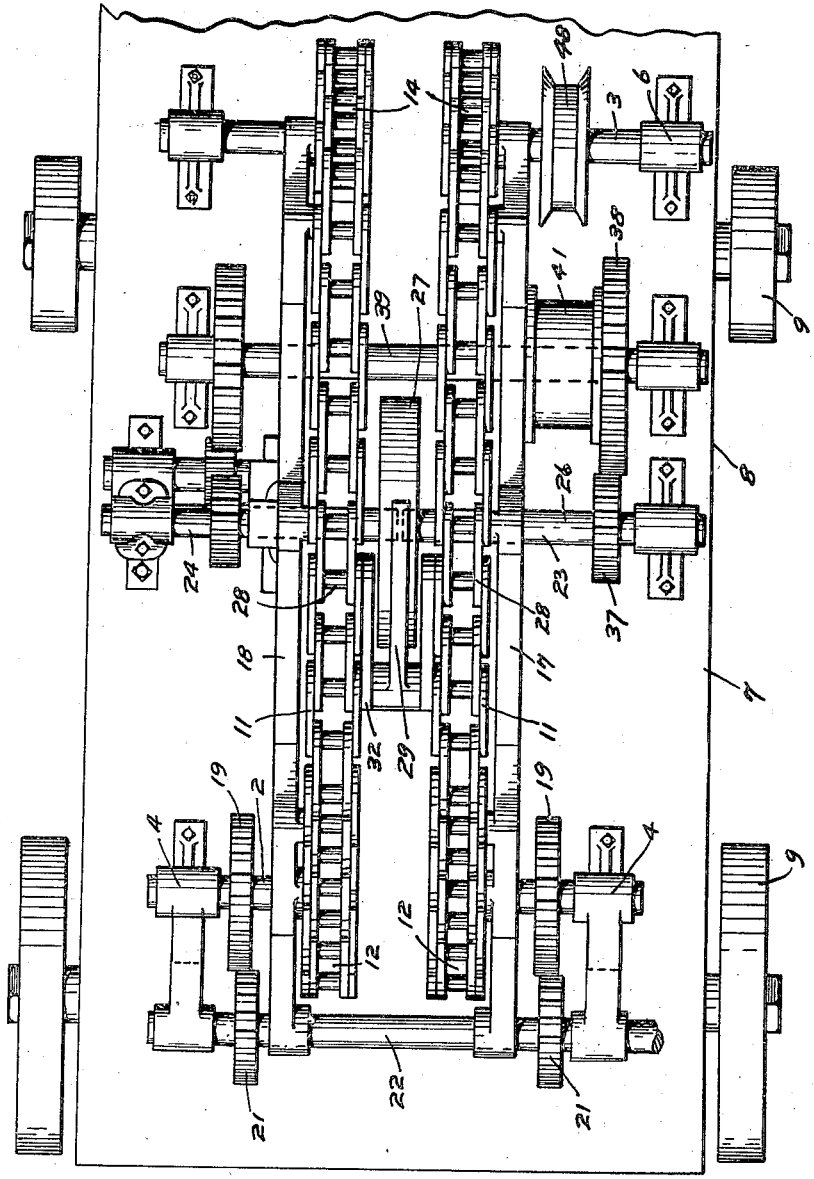
INVENTOR.
CHARLES B. GOLDSMITH
BY
ATTORNEYS.

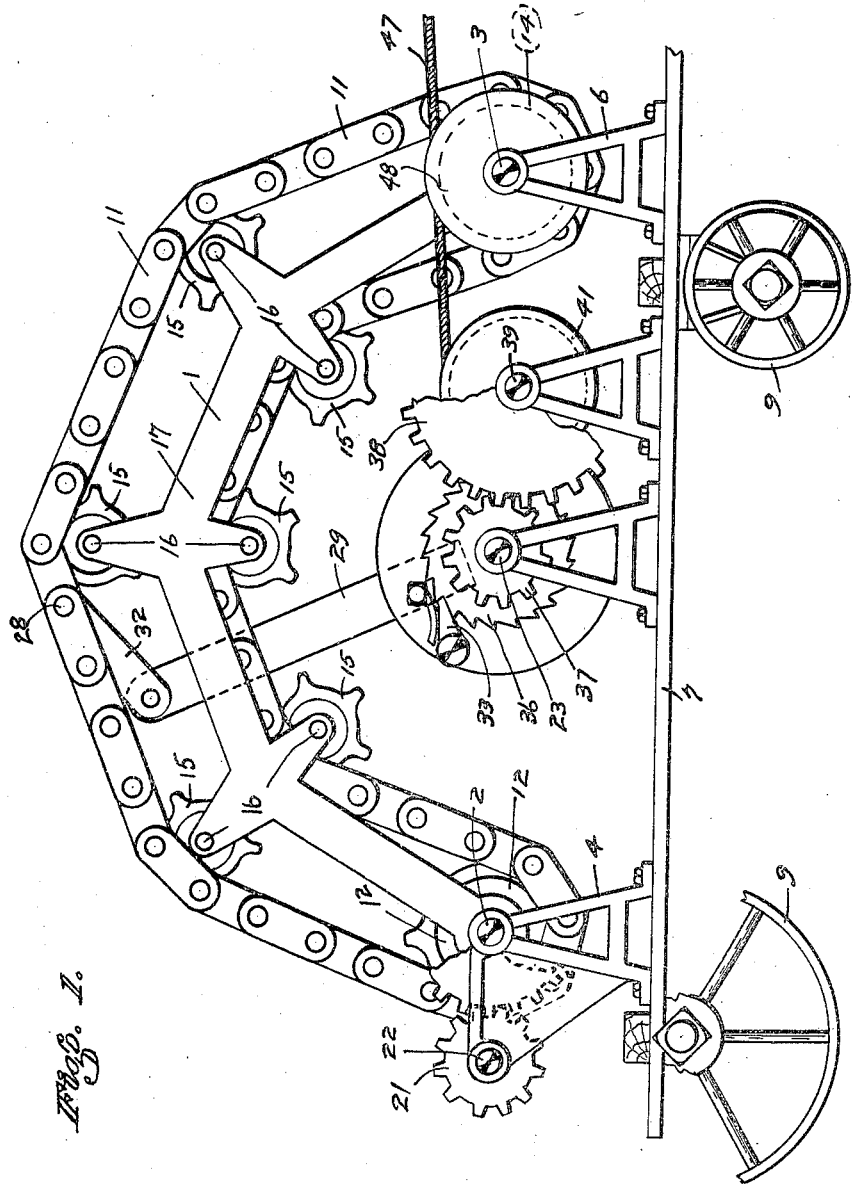

Dec. 26, 1922.
C. B. GOLDSMITH.
STUMP PULLER.
FILED JULY 18, 1921.
1,440,008
3 SHEETS-SHEET 3
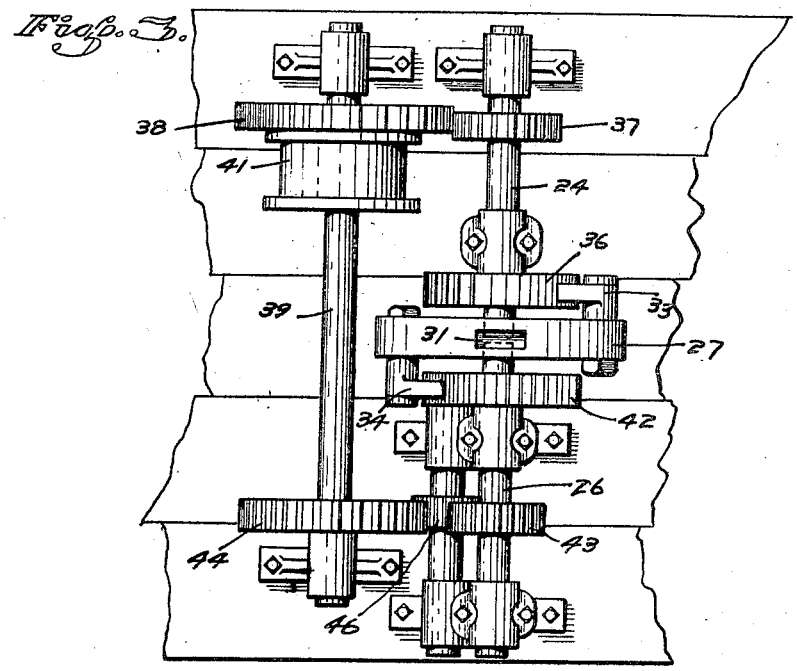
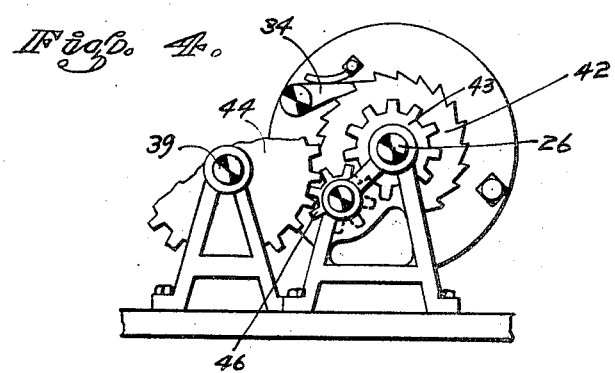
INVENTOR.
CHARLES B. GOLDSMITH.
BY
ATTORNEYS.

Patented Dec. 26, 1922.

1,440,008

UNITED STATES PATENT OFFICE.

CHARLES B. GOLDSMITH, OF SAN FRANCISCO, CALIFORNIA.

STUMP PULLER.

Application filed July 18, 1921. Serial No. 485,567.

*To all whom it may concern:*

Be it known that I, CHARLES B. GOLD-SMITH, a citizen of the United States, and resident of San Francisco, county of San Francisco, and State of California, have invented a new and useful Stump Puller, of which the following is a specification.

The present invention relates to improvements in stump pullers and its object is to provide a device of this character that concentrates an enormous power on the drum pulling the cable by means of which the stump is removed, is strong in its construction, can be made portable and is easily handled by one man.

For reducing my invention to practice I preferably use the mechanism illustrated in the accompanying drawing, in which Figure 1 represents a side elevation of my stump puller, Figure 2 a plan view of the same, Figure 3 a detail plan view of a portion of the device, illustrating the gearing through which power is transmitted to the drum, and Figure 4 a side elevation of the device shown in Figure 3.

Referring to the drawing in detail, it will be noted that the outstanding feature of my device is the heavy arched frame (1) resting on two horizontal shafts (2) and (3), which latter are supported in the standards (4) and (6) bolted to the bed (7) of the truck (8), of which the wheels (9) are shown in the drawing. This arched frame consists of two parallel members (17) and (18) and serves as a guide for two endless chains (11), which pass over sprocket wheels (12) secured on the shaft (2), sprocket wheels (14) secured on the shaft (3), and a plurality of sprocket wheels (15) supported on transverse shafts (16) extending in two arched rows between the two members (17) and (18) of the frame (1). It will be seen that in this manner, when the sprocket wheels (12) are rotated, each link of the endless chains passes around these wheels, over the upper arched rows of sprocket wheels (15), around the sprocket wheels (14) and over the lower arched rows of sprocket wheels back to the sprockets (12). The latter are on the same shaft with gear wheels (19), which latter receive rotary motion from pinions (21) secured to the drive shaft (22).

Centrally between the two shafts (2) and (3) a third shaft (23) is provided parallel with the same. The latter shaft is transversely divided into two parts (24) and (26), (see Figure 3) and carries loosely the disc (27) at the joint. This disc is operatively connected with two corresponding links (28) of the endless chains through an arm (29), which is adapted to be inserted into a radial recess (31) in the disc, and a link (32) pivotally secured to the end of the arm and the link (28). The arm is long enough to extend from the disc to a point located substantially centrally with reference to the path of the endless chains so that it can always follow the motions of the connecting link. Starting from the position shown in Figure 1, it will be readily seen that when the chain, and with it the link (28), moves the arm moves with it until the link reaches the lowest point on its downward travel, when the arm will come to rest until the link has travelled upward again through a certain distance. Then it will pull the arm in the opposite direction until the opposite sprocket wheel has been reached, when the arm again will be turned. Thus the arm will swing back and forth and cause the disc to go through the same motions. The disc is provided on either side with a pawl (33) and (34) (see Figure 3) pointing in opposite directions. The pawl (33) is adapted to engage a ratchet wheel (36) keyed to the shaft (24), which latter also carries the pinion (37) and through it and the gear wheel (38) transmits rotary motion to the shaft (39) having the drum (41) rigidly secured thereto.

The pawl (34) (see Figure 4) actuates the ratchet wheel (42) and through it the shaft (26) so that the latter turns in a direction opposite to that of the shaft (24). Is rotary motion is transmitted to the shaft (39) through the gear wheels (43) and (44), and an idler (46) is interposed between the two wheels to reverse the direction so that the shaft (39) is rotated in the same direction by both pawls.

It will be seen that in this manner the rocking motion of the disc is transferred into a unidirectional rotary motion of the shaft (39) and the drum (41), to which one end of the cable (47) is secured. The other end of the cable is secured to the stump to be pulled and it will be readily seen that a tremendous power can be exerted on the cable by means of the long lever arm (29). A pulley (48) serves as a guide for the cable (42).

I claim:

1. A driving mechanism for a device of the character described including an axially supported member having a radial arm thereon, guiding members arranged in arch formation mounted over the same having endless chains thereon, an operative connection between the arm and corresponding links of the chain and means for imparting motion to the endless chains whereby the arm and its supporting member are rocked.

2. In a device of the character described, mounting means for an endless chain comprising two rotatably mounted end members and two rows of guiding members arranged in arched formation relative to the end members.

3. In a device of the character described, mounting means for an endless chain comprising two parallel supporting shafts having sprocket wheels mounted thereon and a frame mounted over the shafts having two arched rows of sprocket wheels secured thereto, all the sprocket wheels being in one plane.

4. A driving mechanism for a device of the character described comprising an axially supported member having a radial arm thereon, guiding members arranged in arch formation mounted over the same having endless chains thereon, an operative connection between the arm and corresponding links of the chain, means for imparting motion to the endless chains whereby the arm and its supporting member are rocked, a driven element, and means for transmitting uni-directional rotary motion to the same from the rocking member.

5. A driving mechanism for a device of the character described comprising an axially supported member having a radial arm thereon, arched frame members supported over the said member having a plurality of sprocket wheels mounted therein in arch formation, an endless chain engaging the same, an operative connection between the arm and a corresponding link of the chain, means for imparting motion to the endless chains whereby the arm and its supporting member are rocked, a driven element, and means for transmitting uni-directional rotary motion to the same from the rocking member.

6. A driving mechanism for a device of the character described comprising an axially supported member having a radial arm thereon, arched frame members supported over the same having a plurality of sprocket wheels mounted therein in arch formation, an endless chain engaging the same, an operative connection between the arm and a corresponding link of the chain, means for imparting motion to the endless chain whereby the arm and its supporting member are rocked, a ratchet wheel supported on either side of the said member, a pawl on either face of the same adapted to engage one of the ratchet wheels whereby the two ratchets are intermittently rotated in opposite directions, a driven element, and means for transmitting uni-directional rotary motion to the same from the ratchets.

CHARLES B. GOLDSMITH.